United States Patent [19]
Ohmori et al.

[11] Patent Number: 5,506,023
[45] Date of Patent: Apr. 9, 1996

[54] MAGNETO-OPTICAL DISC

[75] Inventors: Takashi Ohmori; Hirotoshi Fujisawa, both of Tokyo; Tadao Yoshida, Kanagawa, all of Japan

[73] Assignee: Sony Corporation, Japan

[21] Appl. No.: 296,536

[22] Filed: Aug. 26, 1994

Related U.S. Application Data

[63] Continuation of Ser. No. 719,111, Jun. 20, 1991, abandoned.

[30] Foreign Application Priority Data

| Jun. 29, 1990 | [JP] | Japan | 2-172495 |
| Jul. 6, 1990 | [JP] | Japan | 2-177251 |
| Nov. 20, 1990 | [JP] | Japan | 2-312618 |

[51] Int. Cl.$^6$ .................. G11B 5/66; B32B 3/02
[52] U.S. Cl. .......... 428/64.3; 428/64.6; 428/65.1; 428/65.2; 428/694 ML; 428/694 DE; 428/694 AH; 428/694 FR; 428/695; 428/900
[58] Field of Search ............... 428/694 ML, 694 DE, 428/694 AH, 695, 900, 64.3, 64.6, 65.1, 65.2, 694 FR

[56] References Cited

U.S. PATENT DOCUMENTS

| 4,760,012 | 7/1988 | Mochizuki et al. | 430/273 |
| 4,849,305 | 7/1989 | Yanagisawa | 428/695 |
| 5,053,288 | 10/1991 | Hoshimoto | 428/694 |

FOREIGN PATENT DOCUMENTS

| 0271873A2 | 6/1988 | European Pat. Off. ....... C08G 59/30 |
| 0373763 | 6/1990 | European Pat. Off. . |
| 01168115 | 4/1991 | Japan . |

OTHER PUBLICATIONS

Patent Abstracts of Japan, vol. 14, No. 199 (P–1040), 23 Apr. 1990 & JP–A–2 040 149 (Hitachi Ltd), 8 Feb. 1990.
Patent Abstracts of Japan, vol. 13, No. 32 (P–817), 25 Jan. 1989 & JP–A–63 229 643 (Fujitsu Ltd), 26 Sep. 1988.
Patent Abstracts of Japan, vol. 13, No. 547 (P–971), 11 Sep. 1989 & JP–A–1 227 241 (Alps Electric Co., Ltd.), 11 Sep. 1989.
Patent Abstracts of Japan, vol. 13, No. 239 (P–879), 6 Jun. 1989 & JP–A–1 043 834 (Alps Electric Co., Ltd), 16 Feb. 1989.
Patent Abstracts of Japa, vol. 15, No. 95 (P–1176), 7 Mar. 1991 & JP–A–2 308 445 (Fujitsu Ltd.), 21 Dec. 1990.

Primary Examiner—Leszek Kiliman
Attorney, Agent, or Firm—Limbach & Limbach; Charles P. Sammut

[57] ABSTRACT

A magneto-optical disc having an optical-magnetic recording layer, formed on the surface of a transparent base plate opposite its beam incident surface is disclosed, wherein a layer excellent in lubriciousness is formed in superimposition on the optical-magnetic recording layer to enable the magnetic head to be in direct sliding contact with the disc surface to provide for stable recording and improved recording performance as well as to reduce adverse effects caused by deposition of foreign matter such as dust and dirt.

14 Claims, 5 Drawing Sheets

MAGNETO-OPTICAL DISC

This is a continuation of application Ser. No. 07/719,111 filed on Jun. 20, 1991, now abandoned.

BACKGROUND OF THE INVENTION

1. Field of the Invention

This invention relates to a magneto-optical disc used as a recording medium for an external memory of an electronic computer or a recording/reproducing apparatus adapted for recording/reproducing audio or video signals.

2. Description of the Prior Art

There has hitherto been proposed a magneto-optical disc having a signal recording layer with which perpendicular recording is possible. For writing information signals on the magneto-optical disc, the region of the signal recording layer in which to write the information signals is heated to not lower than the Curie temperature by converging and radiating a laser beam thereto. Simultaneously, an external magnetic field is applied to the region. The signal recording layer, which has been heated to at least the Curie temperature, is substantially bereft of coercivity, so that its direction of magnetization is inverted so as to follow the direction of the applied external magnetic field. By inverting the direction of magnetization of the signal recording layer in this manner, it becomes possible to write information signals in the form of, for example, digital signals.

Meanwhile, the magneto-optical disc is usually loaded alone on the recording apparatus for recording information signals, similarly to the optical disc, such as the compact disc. Since the base plate of the magneto-optical disc, on which the signal recording layer is formed, is constituted by a synthetic resin, such as transparent polycarbonate resin, warping tends to be produced in the base plate due to heat shrinkage during molding, as a result of which the disc surface tends to undergo deviations from the horizontal during rotational driving of the disc. If the disc surface undergoes deviations from the horizontal during disc rotation, the distance between the magnetic head impressing the magnetic field and the signal recording surface of the disc is changed. Thus the strength of the magnetic field impressed by the magnetic head on the signal recording layer is fluctuated, so that optimum recording of the information signals cannot be achieved. If the deviations of the disc surface during disc rotation be excessive, destruction may occur if the magnetic head is brought into contact with the recording layer of the magneto optical disc.

For preventing incorrect recording due to disc surface deviations or damage to the signal recording surface of the disc, as well as to prevent wear or damage to the magnetic head, there has also been proposed a magneto-optical disc in which a disc-shaped lubricious sheet of a reduced thickness, formed of a high polymeric material, such as polyethylene terephthalate, is provided on the recording and/or reproducing apparatus and adapted to be brought, into intimate contact with the surface of a magneto-optical disc facing a contact type magnetic head during recording of the information signals, so that the magnetic head is thrust into sliding contact with the lubricious sheet. With the use of such lubricious sheet, the magnetic head may be slidingly contacted with the lubricious sheet under a predetermined constant force, even though the magneto-optical disc surface undergoes deviations from the horizontal, so that a predetermined constant distance may be maintained between the magnetic head and the magneto-optical disc to provide a uniform magnetic field impressed on the magneto-optical disc.

However, since the magneto-optical disc is loaded alone in the recording and/or reproducing apparatus, foreign matter, such as dust and dirt from an external environment, tends to be deposited on the disc surface. If the lubricious sheet is provided on the recording/reproducing apparatus, the distance between the magnetic head and the signal recording layer of the disc tends to be changed by dust and dirt occasionally affixed between the lubricious sheet and the recording layer side of the disc. As a result, the magnetic field impressed from the magnetic head to the signal recording layer tends to be changed in magnitude, thereby producing the effect of amplitude modulation.

For overcoming such drawback, it has also been contemplated that the magneto-optical disc be accommodated in a cartridge composed of an Upper half and a lower half abutted and connected to each other as a disc Cartridge similarly to a resilient fragile floppy disc. However, if such disc cartridge is used as a recording medium, the magnetic head cannot be slidingly contacted with the magneto-optical disc accommodated in the cartridge, so that recording of information signals cannot be made because as the cartridge is completely hidden by the lubricious sheet of a size large enough to cover the magneto-optical disc provided on the recording/reproducing apparatus to render it impossible to cause the magnetic head to be intruded into the inside of the cartridge.

OBJECTS AND SUMMARY OF THE INVENTION

It is therefore an object of the present invention to provide a magneto-optical disc in which the magnetic head is brought into direct sliding contact with the disc surface to enable information signals to be recorded and/or reproduced on or from the disc.

It is another object of the present invention to provide a magneto-optical disc which may be handled and loaded alone in the recording and/or reproducing apparatus.

It is a further object of the present invention to provide a magneto-optical disc in which the distance between the magnetic head and the signal recording layer of the disc may be maintained at a constant value without being affected by foreign matter such as dust and dirt to enable information signals to be recorded as well as to prevent wear of the magnetic head.

It is yet another object of the present invention to provide a magneto-optical disc which is accommodated in a cartridge and loaded in this state into the recording/reproducing apparatus.

The present invention provides a magneto-optical disc which is provided with an optical-magnetic recording layer on the surface of a transparent base plate opposite to its beam-incident surface, and which is also provided with a lubricious layer in superimposition on the optical-magnetic recording layer.

With the present magneto-optical disc, since the lubricious layer is superimposed on the optical-magnetic recording layer, the magnetic head may be brought into direct sliding contact with the disc surface. Any foreign matter, such as dust and dirt, may be prevented from being deposited between the optical-magnetic recording layer and the lubricious layer, while a constant distance may be maintained between the magnetic head and the signal recording layer.

Since the lubricious layer is provided on the disc itself, there is no necessity for providing a lubricious sheet in the recording/reproducing apparatus.

When the magneto-optical disc is accommodated in a cartridge and loaded in this state in the recording/reproducing apparatus, a lubricious layer may be provided on the disc surface slidingly contacted by the magnetic head.

Other objects and advantages of the present invention will become more apparent from the following detailed description of illustrative embodiments of the invention.

DETAILED DESCRIPTION OF PREFERRED EMBODIMENT

A magneto-optical disc D according to the present invention has a diameter R equal to about 12 cm and a center aperture 1a.

Figure 1:
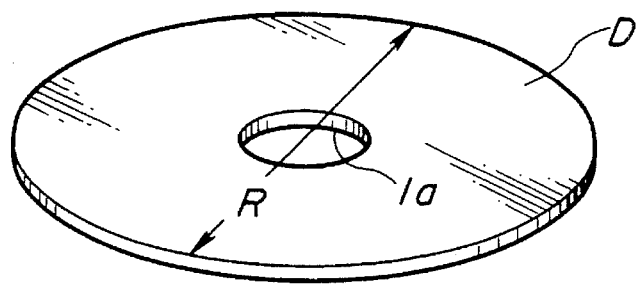
FIG. 1 is a perspective view of a magneto-optical disc according to the present invention.
Figure 2:
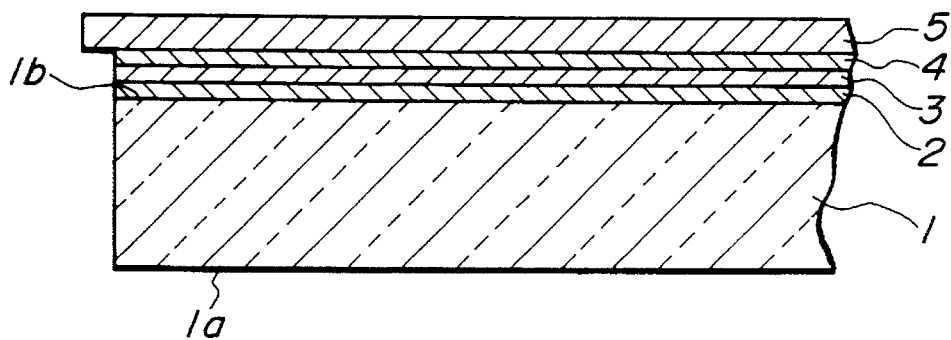
FIG. 2 is an enlarged partial cross-sectional view of the magneto-optical disc shown in FIG. 1.

As shown in detail in FIG. 2, the magneto-optical disc D has a transparent base plate 1 capable of transmitting a laser light therethrough, and a signal recording layer 2 and a protective film layer 3 sequentially formed on the base plate 1.

The transparent base plate is formed of a light-transmitting transparent synthetic resin, such as polycarbonate resin, acrylic resin, polyolefin resin or epoxy resin, and is molded into a disc by, for example, injection molding. In the present embodiment, the base plate 1 has the diameter R equal to about 12 cm.

The transparent base plate 1 has an optically smooth surface 1a on which the laser light is incident, and which is that surface directed to an optical head, not shown. The base plate 1 has an opposite surface 1b on which the signal recording layer 2 is formed and which is provided with a guide groove and an address code, both not, shown, by protections and recesses having lengths equal to about one-fourth the wavelength of the laser light.

The signal recording layer 2, which is provided on the surface 1b of the transparent base plate 1 opposite to the surface 1a on which is incident the laser light, is formed by an amorphous magnetic layer having an axis of easy magnetization in the direction normal to the film surface. Thus the signal recording layer 2 is formed by a magnetic layer of, for example, TbFeCo, exhibiting high coercivity at ambient temperature. The signal recording layer 2 may be formed of any material commonly employed with this type of magnetic recording medium.

In general, a dielectric layer formed of silicon nitride or aluminum nitride is provided below the signal recording layer 2, that is, between the transparent base plate 1 and the signal recording layer 2, while a similar dielectric layer and an aluminum reflective layer are deposited on the signal recording layer 2.

The protective layer 3, provided on the signal recording layer 2, is provided for protecting the signal recording layer 2 from an impact from outside or contact with the foreign matter, and is formed by, for example, a UV curable resin layer (UV layer). In the present embodiment, the protective layer 3 is formed by spin coating a UV curable resin to a coating thickness of the order of 20 μm.

With the magneto-optical disc according to the present invention, a lubricious layer 5 exhibiting excellent lubricity is formed on the protective layer 3 by the interposition of an adhesive layer 4. The function of the lubricious layer 5 is cause the magnetic head to follow surface deviations of the magneto-optical disc when the magneto-optical disc is loaded in the recording apparatus having the contact type magnetic head for magnetic recording. It is therefore desirable for the lubricious layer 5 to be formed of a material having excellent properties with respect to the temperature and humidity, excellent mechanical properties and excellent durability against sliding contact with the magnetic head and a lower frictional resistance with respect to the magnetic head. For satisfying these conditions, a high polymeric material, such as polyethylene terephthalate, may be employed as the material for the lubricious layer 5.

The lubricious layer 5 is a sheet of a high polymeric material, such as polyethylene terephthalate, which is bonded to the protective layer 3 by the interposition of the adhesive layer 4. As the adhesive layer 4, used for bonding the sheet, an adhesive material such as a coating type adhesive or an adhesive sheet may be employed. By using such adhesive material, the adhesive layer 4 functions as a shock-absorbing material to reduce the shock otherwise applied to the transparent substrate 1 from the magnetic head. In view of the strength of the magnetic field applied by the magnetic head and follow-up properties of the magnetic head with respect to surface deviations of the magneto-optical disc, the lubricious layer 5 is preferably of a thickness not more than 200 μm.

In an embodiment shown in FIG. 2, the sheet of the lubricious layer 5 is of a slightly larger diameter than the base plate 1 so that the lubricious layer 5 may be positively formed as far as the outer periphery of the base plate 1. By forming the lubricious layer 5 in this manner, protection of the magnetic head may be achieved because the magnetic head may be positively kept in sliding contact with the lubricious layer 5 without the magnetic head directly contacting with the base plate 1.

Figure 3:
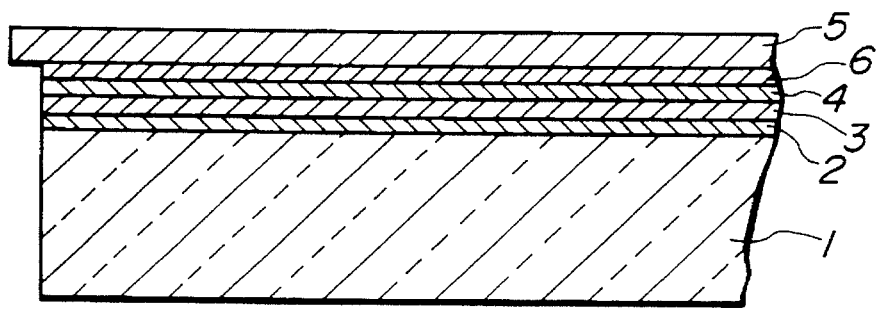
FIG. 3 to 6 are enlarged partial cross-sectional views showing various modifications of the magneto-optical disc according to the present invention.

Meanwhile, this type of the magnetic disc is occasionally provided with a label 6 indicating the recording contents. If such label 6 is provided, it is provided on the lower surface of the lubricious layer 5, as shown in FIG. 3, so that the advantage derived from the lubricious layer 5 is not lost. If such label 6 is provided, the lubricious layer 5 is formed of a transparent material to enable the label 6 to be seen through. Meanwhile, if the lubricious layer 5 is formed by a sheet of a high polymeric material, a display corresponding to the label may be directly provided, such as by printing, on a disc surface region which is out of sliding contact with the magnetic head during recording of the information signals.

Figure 4:
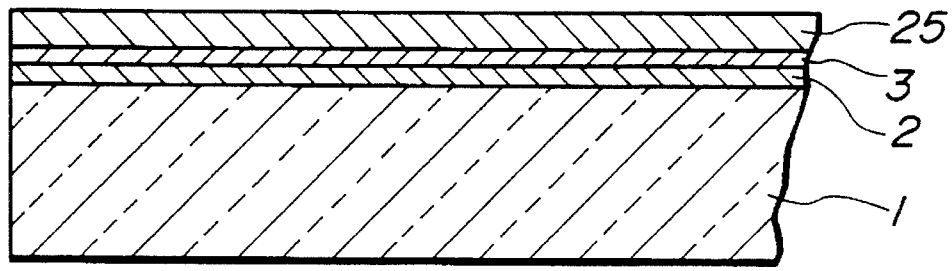
Figure 5:
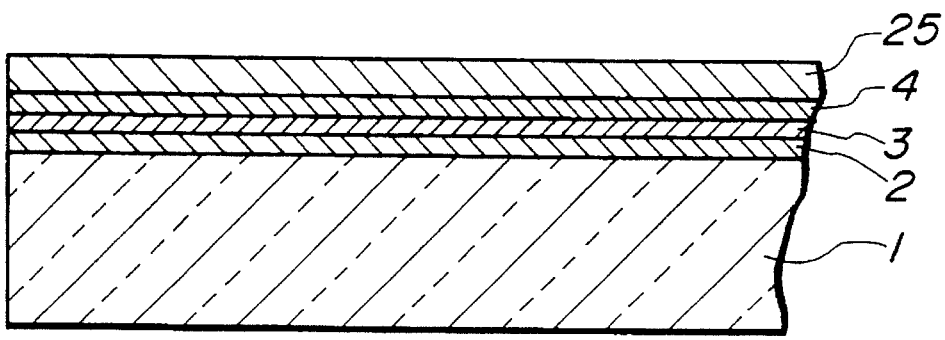

In the above embodiment, the lubricious layer 5 is a sheet of a high polymeric material, such as polyethylene terephthalate, which is bonded to the protective layer 3 by the interposition of the adhesive layer 4. However, the layer having excellent lubricity is not limited thereto but may also be formed by spin coating a resin, such as UV curable resin (UV resin) mixed with a compound, such as silicon oxide or carbon, designed for improving lubricity and preventing excess contact. A lubricious layer 25, formed by spin coating, is directly applied and formed on the protective layer 3, as shown in FIG. 4. When the lubricious layer 25 is formed by spin coating, the adhesive layer may be interposed between the protective layer 3 and the lubricious layer 25 to improve shock-absorbing properties during sliding contact of the magnetic head with the magneto-optical disc.

Figure 6:
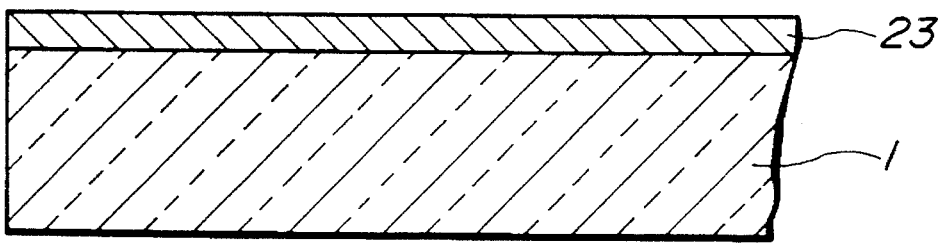

Alternatively, the UV curable resin mixed with the compound, such as silicon oxide or carbon, may be directly applied and formed by spin coating on the signal recording layer 2 to provide a protective lubricious layer 23 which may be used simultaneously as a protective layer and a lubricious layer, as shown in FIG. 6.

When the above described magneto-optical disc D is loaded in the recording apparatus having a contact type magnetic head, since the magnetic head is operated in perpetual contact with the lubricious layer 5 or with the protective lubricious layer 23, formed as one with the magneto-optical disc, it becomes possible for the magnetic head to follow occasional surface deflections of the magneto-optical disc D. Consequently, since the distance between the magnetic head and the signal recording layer 2 is not changed, stable recording of information signals may be achieved without the strength of the magnetic field impressed on the signal recording layer 2 being changed. Also, since the lubricious layer 25 or the lubricious protective layer 23 is provided to overlie the signal recording layer 2, it becomes possible to prevent foreign matter, such as dust and dirt, from becoming deposited on the signal recording layer 2 and to protect the signal recording layer 2 against impact or damages from outside.

In this manner, with the magneto-optical disc D of the present invention, it becomes possible to follow surface deviations produced during rotation to provide for positive contact of the magnetic head with the disc to prevent the distance between the magnetic head and the signal recording layer 2 from being changed due to the deposit, ion of the foreign matter, such as dust and dirt.

A magnetic apparatus for recording desired information signals on the above described magneto-optical disc D as the recording medium, is hereinafter explained.

Figure 7:
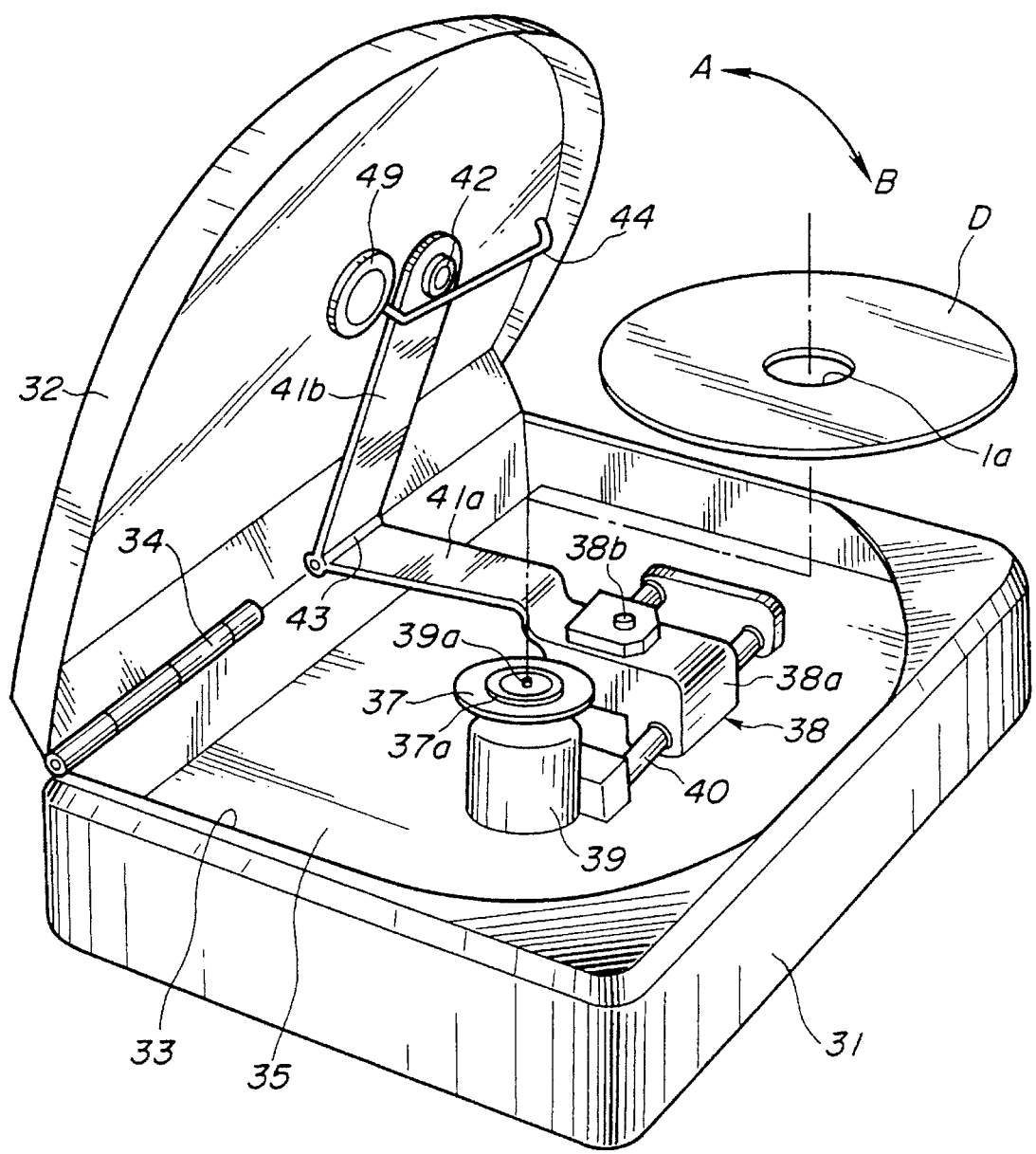
FIG. 7 is a perspective view showing a recording apparatus to which a magneto-optical disc according to the present invention is loaded.

The recording apparatus, employing the magneto-optical disc D as the recording medium, is formed by a substantially rectangular main body of the apparatus 31 having an open top, and a lid 32 provided on the top of the main body 31 for closing an opening 33 of the main body 31, as shown in FIG. 7. The main body 31 and the lid 32 are supported for rotation relative to each other by a hinge 34. Thus the lid 32 may be turned with respect to the main body 31 in the directions shown by arrows A and B to open or close the opening 33 of the main body of the apparatus 31.

Figure 8:
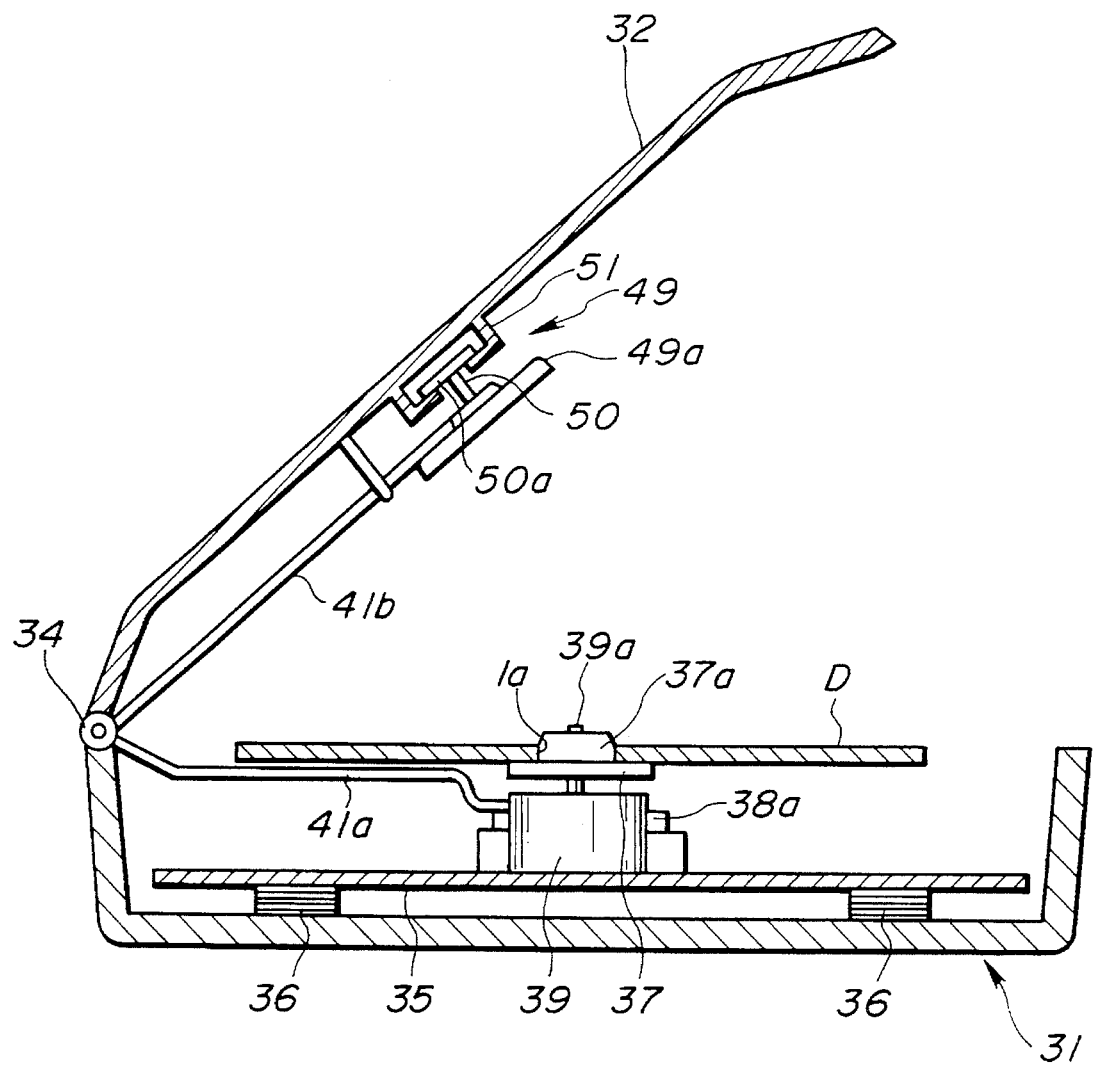
FIG. 8 is a longitudinal cross-sectional view of the apparatus of FIG. 7, with the lid opened.

A chassis 35 is provided within the main body of the apparatus 31. Referring to FIG. 8, the chassis 35 is floatingly supported by plural dampers 36 provided on the bottom of the main body of the apparatus 31. A disc 37 and an optical pickup 38 are provided on the chassis 35.

The disc table 37 is supported substantially in parallel with the chassis 5 by being mounted on the distal end of a driving shaft 39a of a spindle motor 39 mounted on the chassis 35. A tapered or frusto-conical disc positioning projection 37a is provided at the center of the upper surface of the disc table 37 on the distal end of the driving shaft 39a. When placed on the disc table 37, the magneto-optical disc D is positioned coaxially with the driving shaft 39a, with the disc positioning projection 37a being received by the center opening 1a functioning as the chucking aperture.

The optical pickup unit 38 includes an optical block 38a formed by aluminum diecasting and a variety of optical devices enclosing therein, although these devices are not shown. The optical pickup circuit 38 is adapted for converging a laser beam from a light source, such as a semiconductor laser enclosed in an optical block 38a, that is an incident light, through an object lens 38b, on the magnetic-optical disc D, and for detecting the beam reflected back from the magneto-optical disc D, that is the return light, by a photodetector enclosed within the optical block 38a. The optical block 38a has enclosed therein a detection optical system for guiding the return light reflected from the disc D towards the photodetector. The detection optical system is constituted by a Wollaston prism or a condenser lens and is adapted for detecting the direction of the light polarization by the photodetector.

The optical pickup system 38 is supported for movement on supporting rails 40 provided on the chassis 35. Thus, with the present optical pickup unit 38, the object lens 38b is provided on one side of the disc D so as to be moved radially across the inner and outer peripheries of the disc D.

Meanwhile, the object lens 38b is adapted to be moved with respect to the optical block 38a towards and away from the disc D and radially of the disc D for performing focusing servo and tracking servo operations in a known manner.

On the optical block 38a, a magnetic head 42, functioning as the external magnetic field generating device, is mounted for facing the object lens 38b by means of first and second supporting arms 41a and 41b. The first supporting arm 41a is formed by a thin metal plate having its proximal end supported by the optical block 38a and its distal end disposed in the vicinity of the hinge 34. The second supporting arm 41b is formed similarly to the first supporting arm 41a and has its proximal end rotatably mounted by the hinge 43 on the distal end of the first supporting arm 41a. The hinge 43 supports the second supporting arm 41b so that the second supporting arm 41b is operatively associated with the lid 32 so as to be moved away from and towards the chassis 35.

The second supporting arm 41b is introduced between the lower surface of the lid 32 facing the main body of the apparatus 31 and an arm suspension shaft 44 which has its both ends secured to the lower surface of the lid 32. Thus the second supporting arm 41b is operatively associated with the opening and closure of the lid 32 so as to be rotated with the hinge 43 as the center of rotation.

The magnetic head 42 has a coil for generating a magnetic field, housed in a holder formed of a hard material, such as ceramics, and is attached to the distal end of the second supporting arm 41b. When the magneto-optical disc D is mounted on the disc table 37, the magnetic head 42 faces the object lens 38b by the interposition of the disc D. The magnetic head 42 is adapted to be moved in association with the optical pickup unit 38 when the unit 38 is moved radially of the disc D. In short, the optical pickup unit 38 and the magnetic head 42 face each other (with the disc D therebetween) and are moved in unison.

On the inner surface, that is the surface facing the magneto-optical disc 1, of the lid 32, there is provided a chucking member 49 for chucking the disc D loaded on the disc table 37 in cooperation with the disc table 37. This chucking member 49 is provided with a disc-shaped disc thrusting section 49a substantially co-extensive with the disc table 37 on the distal end of the supporting shaft 50. The disc thrusting member 49a is attracted by a magnet 37 provided on the disc table 37, which is used for chucking the magneto-optical disc D. To this effect, a piece of magnetic material, not shown, is provided on at least a part of the thrusting member 49a.

The chucking member 49, provided with the terminal disc thrusting member 49a, is rotatably supported by a tubular support 51 formed on the inner lateral surface of the lid 32 by having a flange 50a on the proximal end of the supporting shaft 50 loosely engaged with and supported by the tubular support 51.

Figure 9:
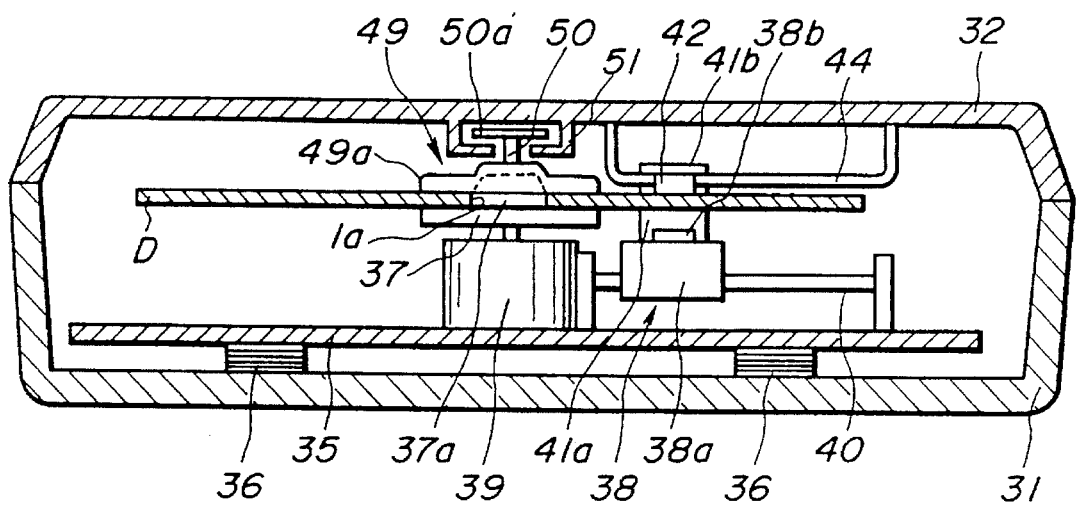
FIG. 9 is a longitudinal cross-sectional view showing the apparatus of FIG. 7 with the lid closed.

The operation of loading the disc D on the above described recording apparatus is carried out with the lid 32 opened as shown in FIG. 8. That is, with the lid 32 in the opened position, as shown in FIG. 8, the magneto-optical disc D is loaded on the disc table 37. With the lid 32 at a closure position, as shown in FIG. 9, the chucking member 49 is engaged with the disc-positioning projection 39a provided on the disc table 37, while being magnetically attracted by magnet 37a provided on the disc table 37. Thus the magneto-optical disc D on the disc table 37 is chucked by the chucking member 49 in cooperation with the disc table 37 to permit the disc D to be rotated in unison with the disc table 37.

Meanwhile, the disc D is loaded on the disc table 37 with the transparent base plate 1 facing the optical pickup unit 38.

When the lid 32 is brought to its closure position and the chucking of the magneto-optical disc D is terminated, the magnetic head 42 is contacted with a predetermined pressure on the lubricious layer 5 or 25 or the protective lubricious layer 23. When the recording apparatus is set to the recording mode, the disc 1able 37 is rotated in unison with the disc D. The magnetic head 42 is moved along the radius of the disc D, while sliding in contact with the lubricious layers 5 or 25 or with the protective lubricious layer 23 of the disc D in synchronism with the optical pickup unit 38.

Meanwhile, even when the rotating magneto-optical disc D should undergo surface deviations, since the magnetic head 42 slides on the lubricious layer 5 or 25 or with the protective lubricious layer 23 formed on the disc D, the magnetic head 42 may be maintained at a constant distance with respect to the signal recording layer 2 of the disc D so as to follow the surface deviations in the disc D. In this manner, a magnetic field of a predetermined strength may be impressed on the signal recording layer 2 of the disc D to permit information signals be recorded on the disc D.

It will be noted that, even when the disc is accommodated in a cartridge and loaded in 1his state on the recording apparatus, since the lubricious layers 5 or 25 or the protective lubricious layer 23 is provided on the base plate 2 of the magneto-optical disc D of the present invention, the disc D may be rotated with the magnetic head contacting with the lubricious layer 5 or 25 or with the lubricious protective layer 23.

In the following, explanation is made of loading a disc cartridge, that is, the magneto-optical disc D of the present invention accommodated in a cartridge, as a recording medium into a recording and/or reproducing apparatus, and recording information signals on the magneto-optical disc D.

Figure 10:
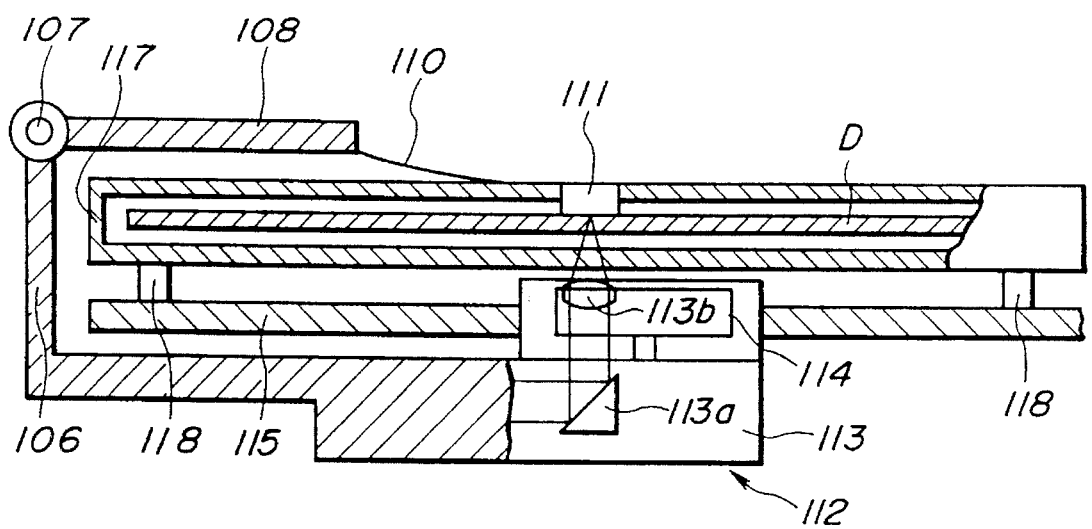
FIG. 10 is a longitudinal cross-sectional view of a recording/reproducing apparatus showing the state in which information signals are recorded with the use as the recording medium of a disc cartridge in which a magneto-optical disc according to the present invention is accommodated.

Referring to FIG. 10, the recording and/or reproducing apparatus, in which the disc cartridge is used as the recording medium, includes a supporting arm 108 rotatably mounted on the main body 106 by means of a hinge 107 and a magnetic head 111 provided on the distal end of a resilient gimbal 110 secured to the distal end of the supporting arm 108. This magnetic head 111 is formed by a magnetic field generating coil housed in a holder formed of a hard material, such as ceramics, and is supported by the resilient gimbal 110.

An optical pickup unit 112, which is operatively associated with the magnetic head 111 so as to be moved radially between the inner and outer peripheries of the disc, is provided on the bottom of the main body 106 at a position facing the magnetic head 111. The optical pickup unit 112 includes an optical head block 113 having an optical device enclosed therein, and is so constructed that the laser light exiting the light source, such as the semiconductor laser, is converged and radiated on the magneto-optical disc by means of a mirror 113a and an object lens 113b and the light reflected from the disc is detected by a photodetector provided within the optical head block 113. Meanwhile, the object lens 113b is adapted to be moved by an actuator 114 with respect to the optical head block 113 in a direction towards or away from the disc to perform focusing servo and tracking servo control for the magneto-optical disc.

Within the main body 106, the magneto-optical disc D accommodated in the cartridge 117 is placed on a chassis 115 which is floatingly supported with respect to the bottom of the main body 106. The magneto-optical disc D is positioned on the disc table, with the central chucking member engaging with the disc table, while the cartridge 117 is supported by a positioning pin 118 provided on the chassis 115.

In the above described recording apparatus, the magnetic head 111 is intimately contacted with the surface of the magneto-optical disc D by means of an aperture provided in the cartridge 117, that is a window opening adapted for exposing the disc D to outside across its inner and outer peripheries. With rotation of the disc table, the magneto-optical disc D is rotated, so that information signals may be recorded on the magneto-optical disc D by the operation of the optical pickup unit 112 and the magnetic head 111.

Since the lubricious layer 5, 25 of the protective lubricious layer 23 is formed integrally on the magneto-optical disc D, the magnetic head 111 may be kept in intimate sliding contact with the magnetic-optical disc D, even though the disc surface should undergo deviations from the horizontal, so that a constant distance may perpetually be maintained between the head and the signal recording layer of the disc D. Thus a magnetic field of a predetermined strength may be impressed on the overall surface of the signal recording layer 2 of the magneto-optical disc D to permit information signals to be recorded on the disc D. Since the magnetic head 111 faces the disc D with the lubricious layer 5 or 25 or the lubricious protective layer 23 in-between, the signal recording layer 2 may be prevented from being damaged by the magnetic head 111. Since the disc D is accommodated in the cartridge 117, the disc may naturally be protected against contamination by foreign matter, such as dust and dirt.

Also by properly selecting the material of the lubricious layers 5, 25 or the lubricious protective layer 23 of the magneto-optical disc D, the disc may have improved wear resistance with respect to the magnetic head 111. The magneto-optical disc D may be applied to any recording system, whether it be the magnetic field modulating system or the light modulation system.

What is claimed is:

1. A magneto-optical disc, comprising:

a transparent base plate;

an optical-magnetic recording layer formed on a surface opposite to a beam incident surface of the transparent base plate; and a lubricious layer, formed in superimposition on the optical-magnetic recording layer, the lubricious layer consisting of a UV cured resin mixed with a lubricity improving compound, the lubricious layer having a larger radius than that of the transparent base plate.

2. The magneto-optical disc according to claim 1, further comprising:

a shock-absorbing intermediate layer interpositioned between the lubricious layer and the optical-magnetic recording layer.

3. The magneto-optical disc according to claim 1, wherein the lubricious layer comprises:

a first layer; and a second layer deposited on the first layer, the second layer having a frictional coefficient lower than that of the first layer.

4. The magneto-optical disc according to claim 1, wherein the lubricious layer is polyethylene terephthalate.

5. The magneto-optical disc according to claim 1, wherein the lubricity improving compound includes silicon oxide.

6. The magneto-optical disc according to claim 1, wherein the lubricity improving compound includes carbon.

7. The magneto-optical disc according to claim 2, wherein the shock-absorbing intermediate layer comprises:

an adhesive layer for bonding the lubricious layer to the optical-magnetic recording layer.

8. The magneto-optical disc according to claim 2, wherein the shock-absorbing intermediate layer comprises:

a protective layer for protecting the optical-magnetic recording layer; and an adhesive layer for bonding the lubricious layer to the protective layer.

9. The magneto-optical disc according to claim 3, further comprising:

a bonding layer interpositioned between the first layer and the second layer.

10. The magneto-optical disc according to claim 3, wherein the second layer contains an antistatic agent.

11. A magneto-optical disc, comprising:

a transparent substrate;

a recording surface layer made of a magneto-optical recording material and formed on a surface of the transparent substrate which is opposite to a beam incident surface of the transparent substrate; and a lubricious layer arranged on a side of the recording surface layer not in contact with the transparent substrate, the lubricious layer formed of a UV cured resin mixed with a lubricity improving compound, the lubricious layer having a larger radius than that of the transparent substrate.

12. A magneto-optical disc, comprising:

a transparent substrate;

a recording layer made of a magneto-optical recording material and formed on a surface of the transparent substrate which is opposite to a beam incident surface of the transparent substrate; and a lubricious layer adhered to the recording surface layer, the recording surface layer interposed between the lubricious layer and the transparent substrate, the lubricious layer formed of a UV cured resin mixed with a lubricity improving compound, the lubricious layer having a larger radius than that of the transparent substrate.

13. A magneto-optical disc, comprising:

a transparent substrate;

a recording layer made of a magneto-optical recording material and formed on a surface of the transparent substrate which is opposite to a beam incident surface of the transparent substrate;

a protective layer formed on a surface of the recording layer which is opposite to a surface of the recording layer in superimposition with the transparent substrate;

an adhesive layer formed on a surface of the protective layer which is opposite to a surface of the protective layer in superimposition with the recording layer;

a label formed on a surface of the adhesive layer which is opposite to a surface of the adhesive layer which is in superimposition with the protective layer; and a transparent lubricious layer formed on a surface of the label which is opposite to a surface of the label which is in superimposition with the adhesive layer, the transparent lubricious layer formed of a UV cured resin mixed with a lubricity improving compound, the transparent lubricious layer having a larger radius than that of the transparent substrate.

14. A magneto-optical disc, comprising:

a transparent substrate;

a recording layer made of a magneto-optical recording material and formed on a surface of the transparent substrate which is opposite to a beam incident surface of the transparent substrate;

a protective layer formed on a surface of the recording layer which is opposite to a surface of the recording layer in superimposition with the transparent substrate;

an adhesive layer formed on a surface of the protective layer which is opposite to a surface of the protective layer in superimposition with the recording layer;

a lubricious layer formed on a surface of the adhesive layer which is opposite to a surface of the adhesive layer which is in superimposition with the protective layer, the lubricious layer formed of a UV cured resin mixed with a lubricity improving compound, the lubricious layer having a larger radius than that of the transparent substrate, the lubricious layer including a first region and a second region, only one of the first and second regions for sliding contact with a magnetic head during recording of information signals onto the recording layer; and a label formed on a surface of the lubricious layer which is opposite to a surface of the lubricious layer which is in superimposition with the adhesive layer, the label formed in the region which does not slidingly contact the magnetic head during recording of the information signals onto the recording layer.

* * * * *